United States Patent [19]

Lichtblau

[11] 4,243,980
[45] Jan. 6, 1981

[54] ANTENNA SYSTEM FOR ELECTRONIC SECURITY INSTALLATIONS

[76] Inventor: George J. Lichtblau, 13 Tannery Hill Rd., Ridgefield, Conn. 06877

[21] Appl. No.: 878,753

[22] Filed: Feb. 17, 1978

[51] Int. Cl.³ .............................................. G08B 13/24
[52] U.S. Cl. .................................... 340/572; 343/742
[58] Field of Search ................ 340/572; 343/741, 742, 343/743, 744

[56] References Cited

U.S. PATENT DOCUMENTS

| 2,366,195 | 1/1945 | Kandoian | 343/741 |
| 4,016,553 | 4/1977 | Novikoff et al. | 340/572 |
| 4,135,183 | 1/1979 | Heltemes | 340/572 |

Primary Examiner—Eli Lieberman
Attorney, Agent, or Firm—Weingarten, Maxham & Schurgin

[57] ABSTRACT

An antenna system for an electronic security installation comprising a pair of substantially identical planar multiple loop antennas respectively connected to the transmitter and receiver of the security system and providing an electromagnetic field of high intensity only in the interrogation region of the system while also discriminating against interferring signals originating outside of the interrogation region. Each planar antenna includes two or more loops lying in a common plane with each loop being twisted 180° with respect to each adjacent loop to be in phase opposition. The transmitting antenna and receiving antenna are substantially identical in size and configuration, and each antenna has a total loop area of one phase equal to the total loop area of opposite phase.

7 Claims, 6 Drawing Figures

ANTENNA SYSTEM FOR ELECTRONIC SECURITY INSTALLATIONS

FIELD OF THE INVENTION

This invention relates to electronic security systems and more particularly to antenna systems therefor.

BACKGROUND OF THE INVENTION

Electronic security systems are known for the detection of the unauthorized removal of items containing a resonant tag circuit. Such systems employ a transmitter providing an electromagnetic field in a zone or region under surveillance, and a receiver operative to detect a resonant tag frequency caused by the presence of a tag in the surveillance zone and to provide an output alarm indication of tag presence. A preferred electronic security system is described in U.S. Pat. Nos. 3,810,147; 3,863,244, and 3,967,161.

In electronic security systems such as those described in the above-cited patents, two identical planar single loop antennas are usually employed, one for transmitting and one for receiving. The transmitting loop antenna generates an electromagnetic field which extends far beyond the immediate area of the security system necessary for system operation. In addition, the receiving antenna is sensitive to external noise generated at great distances from the receiver relative to the small area of interest of system operation.

An antenna system is described in U.S. Pat. No. 4,016,553 in which the inherent problems of a simple loop antenna in an electronic security system are minimized by use of two or more identical parallel loop antennas connected in phase opposition or bucking relationship. The antenna system comprises a cluster of at least two parallel electrically conductive loops of similar size connected in phase opposition so that current always flows in mutually opposite directions through corresponding portions of each loop. As a result, the loops are magnetically arranged in a bucking relationship. The length of and spacing between the loops is small compared to the wavelength of the transmitted or received signals and is disclosed to be typically one tenth of the wavelength. The spacing between the parallel loops is an appreciable fraction, for example one fourth, of the width of the egress passage through which a detectable resonant circuit must pass in a security installation. A separate antenna cluster composed of phase opposed parallel loops can be connected to respective transmitter and receiver of the system, or a single antenna cluster can be employed with both the transmitter and receiver. At distances large compared to the dimensions of the transmitting antenna, the generated electromagnetic waves are cancelled by reason of the phase opposed loop connection. At short distances between the receiving and transmitting antennas, the signals in adjacent parallel antenna conductors do not cancel, resulting in a net detectable signal. Electromagnetic waves incident on the receiving antenna from distances large compared to the antenna dimensions do not provide a sensible antenna signal, but electromagnetic waves incident upon the receiving antenna from sources close to the antenna are sensed to provide a receiving antenna signal.

Thus the antenna system described in U.S. Pat. No. 4,016,553 provides an electromagnetic field in an interrogation region while preventing high intensity fields from occuring outside of the interrogation region. This antenna system also provides detection of selected electromagnetic fields originating in the interrogation region from a resonant circuit while avoiding detection of fields originating from outside of the interrogation region.

The antenna system described in the aforesaid U.S. Pat. No. 4,016,553 suffers several disadvantages in practice. The bucking loop antennas must be separated by a significant distance relative to the distance between the transmitting antenna cluster and receiving antenna cluster. Moreover, the bucking loop antennas must be carefully aligned and balanced for optimum effect. The loops of an antenna cluster are typically spaced apart from each other by a distance corresponding to one fourth the distance across the egress passage. The size of the antenna cluster can become cumbersome for passage widths of conveniently large dimension. For example, for a passage width of six feet, the antenna cluster must be sufficiently large to accommodate a loop spacing of eighteen inches.

SUMMARY OF THE INVENTION

In brief, the present invention provides an antenna system for an electronic security installation comprising a pair of substantially identical planar multiple loop antennas respectively connected to the transmitter and receiver of the security system and providing an electromagnetic field of high intensity in the interrogation region of the system while preventing high intensity fields at distances outside of the interrogation region which are large in comparison to the antenna dimensions. The novel antenna system also discriminates against interferring signals originating outside of the interrogation region at distances large compared with the antenna dimensions. Each planar antenna includes two or more loops lying in a common plane, with each loop being twisted 180° with respect to each adjacent loop to be in phase opposition. The transmitting antenna and receiving antenna are identical or nearly so with respect to the number and size of the two or more loops and are cooperative in that twisted loops of the receiving antenna reverse or decode the adjacent phase relationships of the twisted loops of the transmitting antenna. For each antenna, the total loop area of one phase is equal to the total loop area of opposite phase in order to achieve optimum performance. The invention also provides for higher resonant tag detection sensitivity than conventional loop antennas.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
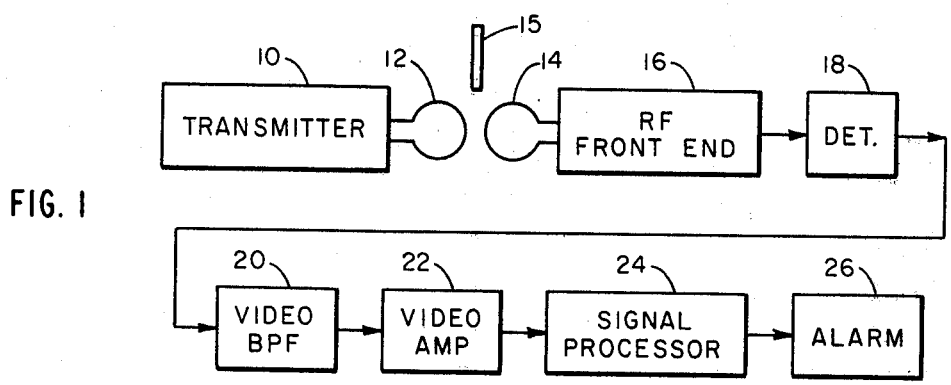
FIG. 1 is a block diagram of an electronic security system in which the invention is employed.

An electronic security system is shown in FIG. 1 and includes a transmitter 10 coupled to an antenna 12 operative to provide an electromagnetic field within a predetermined area to be controlled and which is repetitively swept over an intended frequency range. A receiving antenna 14 at the controlled area receives energy electromagnetically coupled from antenna 12 and is coupled to an RF front end 16 which includes an RF bandpass filter and RF amplifier. The output of the front end 16 is applied to a detector 18, and a video bandpass filter 20 the output of which is effective to pass only an intended frequency band and to remove carrier frequency components and high frequency noise. The output of filter 20 is applied to a video amplifier 22 and thence to signal processor 24, the output signal of which is applied to an alarm 26 or other output utilization apparatus to denote detection of a resonant tag 15 in the controlled area. The system illustrated in FIG. 1, is the subject of the above-identified U.S. Pat. Nos. 3,810,147; 3,863,244 and 3,967,161, and is operative to detect tag presence in a controlled area and to provide an alarm indication thereof. The signal processor 24 includes noise rejection circuitry operative to discriminate between actual tag signals and spurious signals which could be falsely detected as a tag and therefore cause a false alarm, as described in the aforesaid patents.

Figure 2:
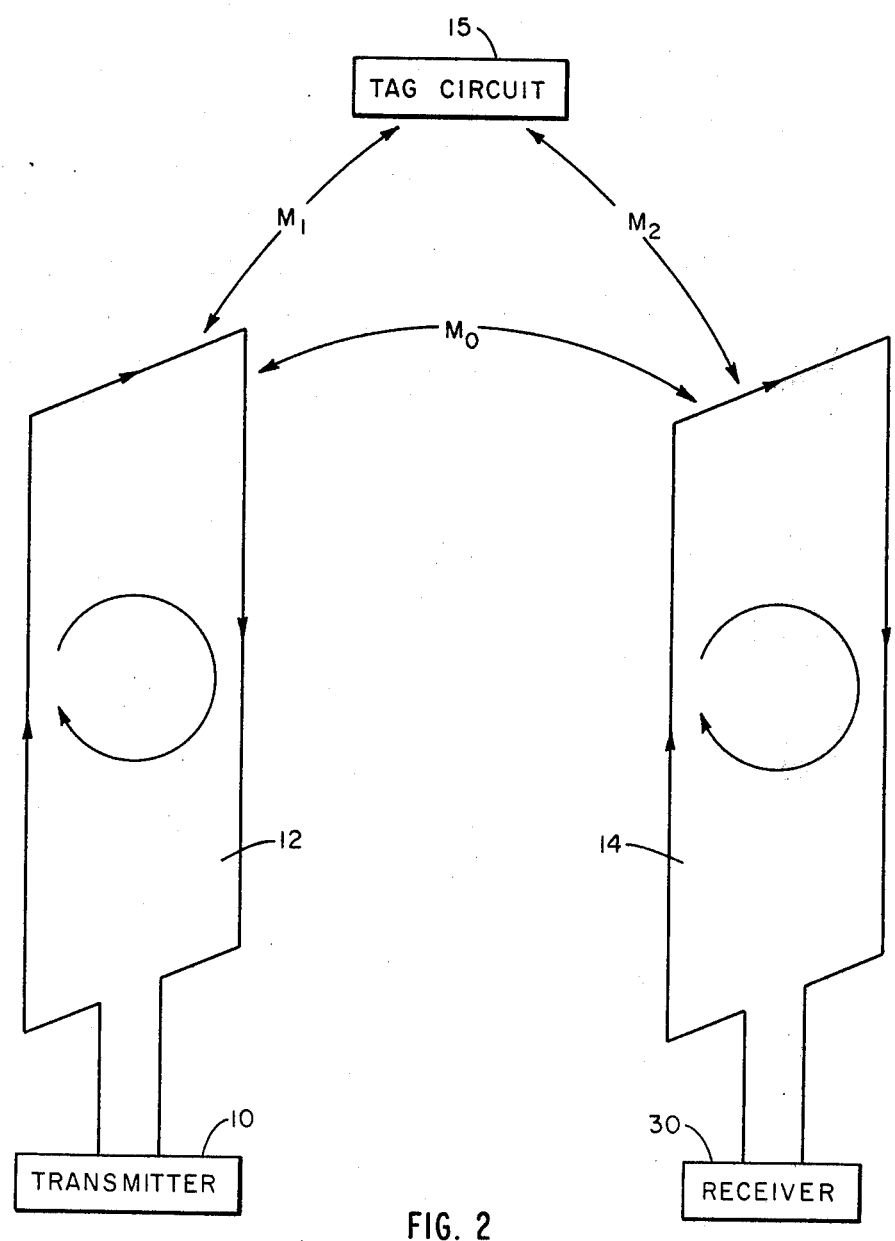
FIG. 2 is a schematic diagram of prior art loop antennas employed in electronic security systems.

The antennas of the single loop type employed in the prior art are schematically illustrated in FIG. 2. The transmitting antenna 12 and receiving antenna 14 are each composed of a single rectangular loop of the same size and shape. The transmitting antenna 12 is connected to and energized by a transmitter 10, while the receiving antenna 14 is connected to a receiver 30 such as that depicted in FIG. 1. The respective antennas 12 and 14 are arranged on opposite sides of a passage or aisle and between which is the interrogation region through which items pass for detection of unauthorized removal. There is a relatively strong mutual magnetic coupling $M_o$ between the antennas 12 and 14. In the presence of a resonant tag circuit 15 in the interrogation region of the system, there is a magnetic coupling $M_1$ from the transmitting antenna 12 to the tag circuit 15, and a magnetic coupling $M_2$ from the tag circuit 15 to the receiving antenna 14. As the transmitted field is swept through the resonant frequency of tag circuit 15, the current induced in the resonant circuit varies as a function of frequency, in well-known manner. The resonant tap couples its induced current to receiving antenna 14 in addition to the signal coupled to the receiving antenna directly from the transmitting antenna 12. The resonant tag signal is then detected and processed in receiver 30 to discriminate a true tag signal from noise to provide an output signal to an alarm or other output utilization apparatus denoting detection of a resonant tag in the controlled area.

In a typical electronic security system installation, the loop antennas 12 and 14 are quite large, for example one foot wide by five feet high, and the transmitting antenna 12 creates relatively strong electromagnetic fields at distances large compared to the distance between antennas 12 and 14, which distance is typically three to six feet. In addition, the receiving antenna 14 is sensitive to magnetic and electromagnetic interference from distances which are large compared to the distances between the antennas. These deleterious characteristics of prior art loop antennas are eliminated or substantially minimized by the novel antenna system to be presently described.

Figure 3:
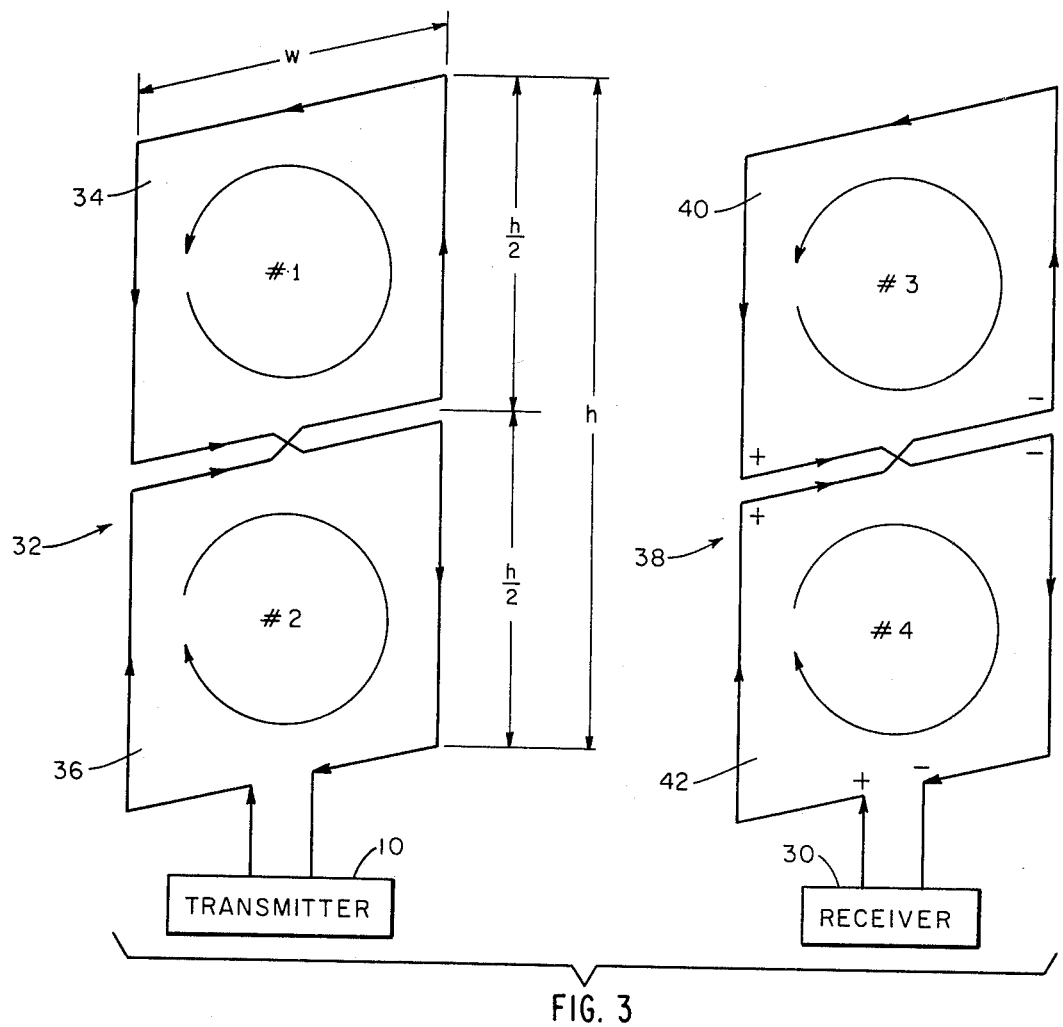
FIG. 3 is a schematic representation of one embodiment of an antenna system according to the invention.

Referring to FIG. 3 there is shown a transmitting antenna 32 lying in a single plane and twisted to form a symmetrical figure-eight pattern composed of an upper or first loop 34 and a lower or second loop 36. The antenna has a height h and a width w, each loop 34 and 36 having a height h/2. The receiving antenna 38 coupled to receiver 30 is identical to transmitting antenna 32 and is composed of a third loop 40 and a fourth loop 42. Each antenna 32 and 38 lies in a respective single plane and is of substantially identical configuration and dimensions with respect to the other antenna. Assuming that the dimensions of the antennas are small compared with the operating wavelength, there is little loss of energy due to radiation and the current through all branches of the figure-eight pattern is identical. In the transmitting antenna 32, the upper current loop (#1) is identical but in phase opposition to the lower current loop (#2). Thus, at distances from the transmitting antenna which are large relative to the dimensions of that antenna, the antenna appears as two equal current loops of precise opposite phase. As a result, at such large distances, the current loops effectively cancel each other.

Figure 6:
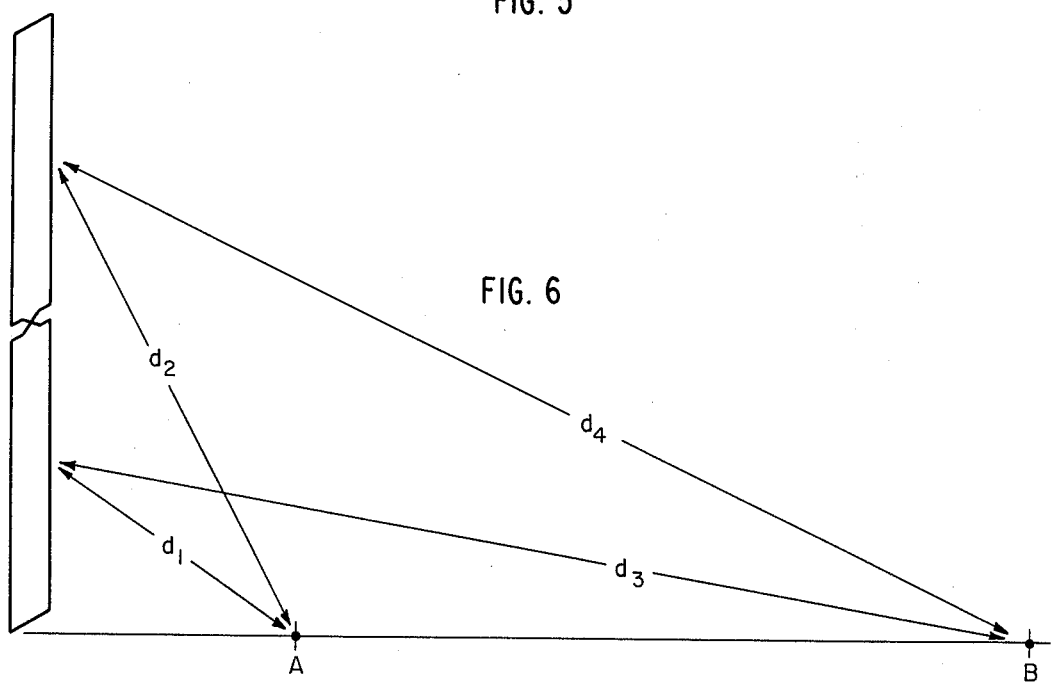
FIG. 6 is a diagrammatic representation of antenna performance as a function of distance from the antenna.

Likewise, signals generated at large distances from the receiving antenna 38, couple almost equally to the upper loop (#3) and the lower loop (#4). Since the upper and lower loops of this antenna are twisted so as to "buck" each other (180° out of phase), signals which are coupled equally to both loops will cancel each other. Thus, the receiving loop antenna has a very low sensitivity to signals generated at large distances from that antenna. These properties of the figure-eight antenna are well known and documented in the literature. FIG. 6 illustrates the typical case. Point B represents a point at a large distance from one of the antennas, for example ten times the antenna height. As a result, the distance $d_3$ from point B to the lower loop is essentially equal to the distance $d_4$ from point B to the upper loop. Thus, the equal and opposite signals generated by the upper and lower loops of the transmitter antenna cancel each other at point B. Likewise, any signal generated at point B is coupled almost equally to the upper and lower loops of the receiving antenna and thus cancel each other.

At distances close to the antenna, for example a distance equal to the height of the antenna, the cancellation effects are not very effective. For example, in FIG. 6 point A represents a point close to the antenna. Obviously, the distance $d_1$ from point A to the lower loop is much less than the distance $d_2$ from point A to the upper loop. Therefore, the signal from the lower loop will be much stronger at point A than the signal from the upper loop. Thus, there will be a net receiver signal at point A. The same holds true in reverse; i.e., any signal generated at point A will be stronger in the lower loop than the upper loop; thus, there will be a net signal from point A to the total antenna.

Figure 4:
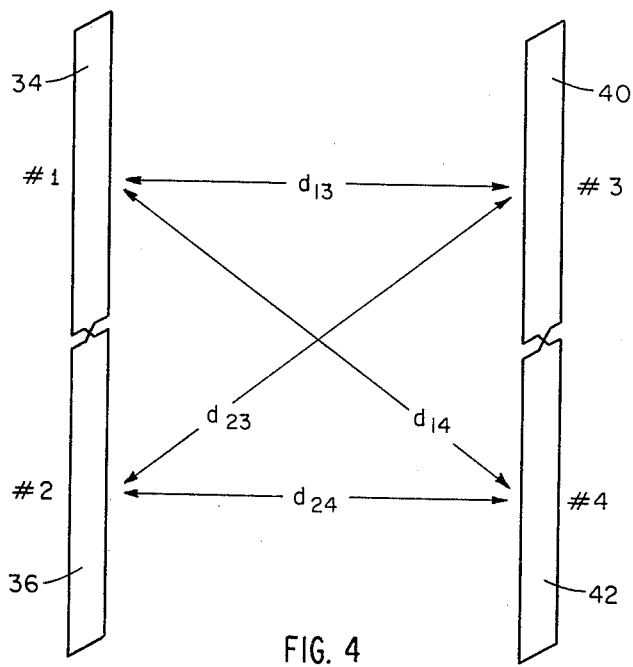
FIG. 4 is a diagrammatic representation of the antenna coupling relationships of the embodiment of FIG. 3.

The receiving antenna 38 is disposed in a single plane which is parallel to the plane in which transmitting antenna 32 is disposed and in approximate alignment therewith. The figure-eight shape of the antenna 38 effectively reverses the phase of each of the opposing loops of the transmitting antenna 32 and results in a net signal to the receiver 30. The coupling relationships of the antennas 32 and 38 are depicted in FIG. 4. The transmitting loop 34 couples positively to receiving loop 40, while transmitting loop 36 couples positively to receiving loop 42. While the voltage induced in loop 40 is opposite to that induced in loop 42, by reason of the opposite sense of current flow in loops 34 and 36, since loop 42 is physically reversed 180° from loop 40, the net effect is to add in series the direct voltages induced in loops 40 and 42 from loops 34 and 36. In effect, the twist of the receiving antenna cancels the twist of the transmitting antenna. In addition to the direct coupling between the respective loops of the transmitting antenna and the corresponding loops of the receiving antenna, loop 34 couples negatively to loop 42, while loop 36 couples negatively to loop 40. These cross coupled voltages in the receiving antenna also add to each other, and the sum of the cross coupled voltages subtracts from the sum of the direct coupled voltages. The net voltage $V_r$ at the receiver can be represented by the following equation $$V_r = (V_{13} + V_{24}) - (V_{14} + V_{23})$$

where $V_{13}$ is the voltage induced by loop 1 (34) into loop 3 (40), $V_{24}$ is the voltage induced by loop 2 (36) into loop 4 (42), $V_{14}$ is the voltage induced by loop 1 into loop 4, and $V_{23}$ is the voltage induced by loop 2 into loop 3. Since the direct distance between loops, $d_{13}$ and $d_{24}$, is always less than the distance between cross coupled loops, $d_{14}$ and $d_{23}$, there is always a magnetic coupling from the transmitting antenna to the receiving antenna. Due to the cancellation effects of the cross coupling components between the transmitting and receiving antennas, it is desirable to provide more current in the figure-eight antenna than in a single turn antenna to obtain the same total voltage at the receiving antenna.

Figure 5:
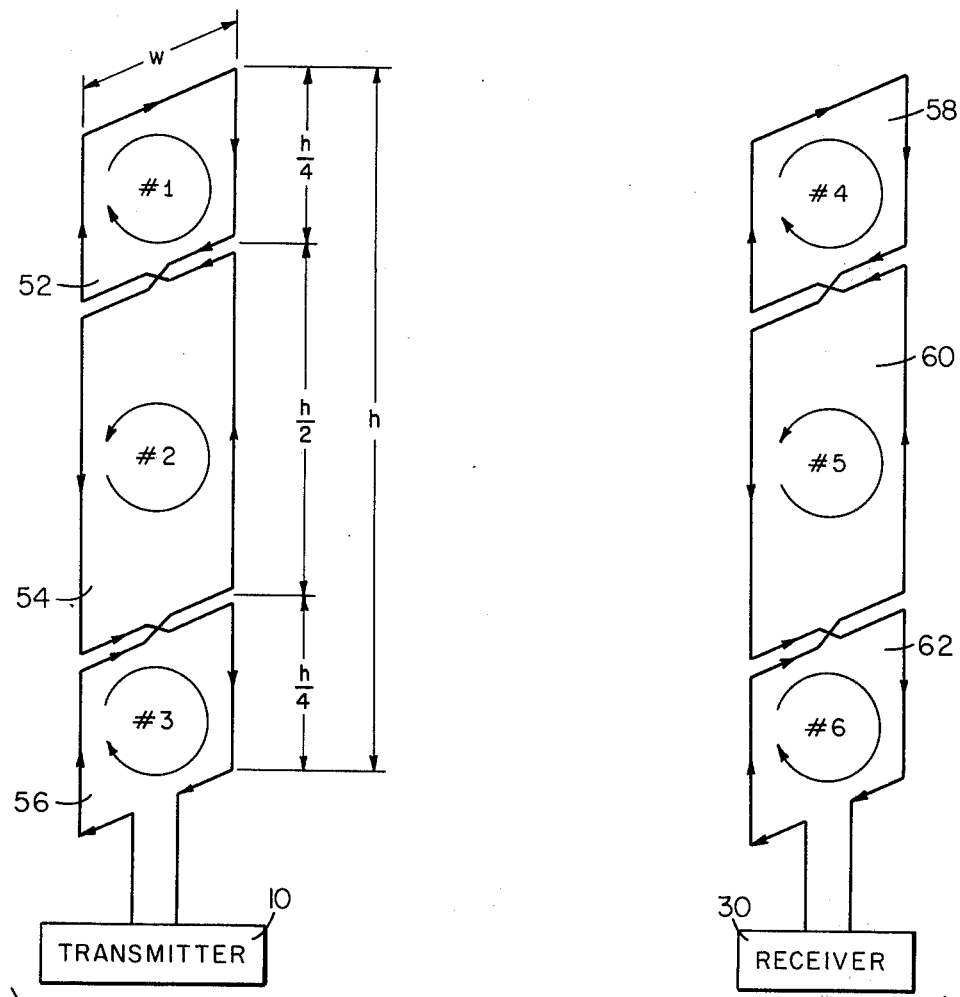
FIG. 5 is a schematic representation of a preferred embodiment of an antenna system according to the invention.

A preferred embodiment of the invention is shown in FIG. 5 and comprises a transmitting antenna coupled to transmitter 10 and having three generally rectangular twisted loops 52, 54, and 56 lying in a common plane, and a substantially identical receiving antenna coupled to receiver 30 and having three twisted loops 58, 60 and 62 lying in a common plane. Each antenna has a width w and a total height h, with the center loops 54 and 60 having a height h/2, twice that of the outer loops 52, 56, 58 and 62. Thus, the outer loops 52 and 56 are each one-half the area of the center loop 54. Similarly, the outer loops 58 and 62 are each one-half the area of the center loop 60. For each antenna, each loop is twisted or opposite in phase to each adjacent loop. The outer loops are in phase with each other, and 180° out of phase with the center loop.

The net voltage $V_r$ at the receiver can be represented for the embodiment of FIG. 5 by the following equation $$V_r = (V_{14} + V_{25} + V_{36} + V_{16} + V_{34}) - (V_{15} + V_{24} + V_{26} + V_{35})$$

where the notation of voltages is the same as described above. Thus, $V_{14}$ is the voltage induced by loop 1 into loop 4 etc. As in the embodiment of FIG. 3 there is always a net magnetic coupling from the transmitting antenna to the receiving antenna. At distances large compared to the antenna dimensions, the effects of loops 1 and 3 (52 and 56) cancel out the effects of loop 2 (54) and thus the electromagnetic field from the transmitting antenna drops rapidly with distance. In addition, the effects of external interference on the receiving antenna are negligible if they are generated at distances large compared to the antenna dimensions since the effects of loops 4 and 6 (58 and 62) cancel out the effects of loop 5 (60).

For optimum external cancellation, the sum of the total areas of all loops of each antenna phase opposing each other should have an algebraic sum of zero. That is, the total area of loops having one phase must be equal to the total area of loops having opposite phase. In some instances the transmitting and receiving antennas need not be identical but can be approximately so. For example, in the presence of a resonant tag circuit, the antennas become unbalanced, and it is sometimes desirable to slightly unbalance one antenna with respect to the other such as to adjust the detection band of the tag circuit.

The invention offers a further advantage over simple loop antennas, such as shown in FIG. 2; namely, the novel antenna system provides for induction of a greater signal into the receiving antenna in the presence of a resonant tag circuit. The signal induced into the receiving antenna is essentially the result of the signal directly coupled from the transmitting antenna to the receiving antenna in addition to the signal coupled from the transmitting antenna to the receiving antenna by way of the magnetically coupled resonant tag circuit. The ratio of the signal coupled by way of the resonant circuit compared to the directly coupled signal from the transmitting antenna to the receiving antenna is dependant upon the geometry of the antenna system and its coupling to the resonant tag circuit.

The area of the tag circuit is small compared to the area of any loop of the antennas, and in any typical detection position between the transmitting and receiving antennas, the tag circuit is preferentially coupled to one loop of the multiple loop receiving antenna. It is unlikely in practice to have the tag circuit at such a position to uniformly couple to all loops of the receiving antenna, and thus the tag couples to a greater extent to one loop of that antenna.

If the signal provided via the tag circuit remains constant, while the direct signal is reduced, there is an increase in the ratio of the tag signal compared to the direct signal, which implies an increase in detection sensitivity. With the present invention, for any given transmitter current level, the net signal coupled directly from the transmitting antenna to the receiving antenna is less than that with simple loop antennas by reason of the bucking effects of the cross coupled loops. The signal coupled to the receiving antenna by way of the tag circuit is, however, not reduced in the same proportion as the cross coupling effects of the transmitting and receiving antennas. The net result is that the signal from the tag circuit is increased relative to the directly coupled signal between the transmitting and receiving antennas when compared to the relationships of simple loop antennas of the prior art.

Thus the present invention provides reduced external fields from the transmitter, reduced noise in the receiver from external sources and inherently higher resonant tag detection sensitivity. Various modifications and alternative implementations will occur to those versed in the art without departing from the spirit and true scope of the invention. Accordingly, the invention is not to be limited except as indicated in the appended claims.

What is claimed is:

1. For use in an electronic security system having a transmitter producing a repetitively swept frequency band, a resonant tag of resonant frequency within the swept band and a receiver to detect any resonant frequency of the tag produced by the swept field and to provide an alarm indication thereof, an antenna system comprising:
   a transmitting antenna adapted for coupling to said transmitter and having three twisted loops lying in a common plane, each loop being in phase opposition with each adjacent loop;
   a receiving antenna adapted for coupling to said receiver and substantially identical to said transmitting antenna and having three twisted loops lying in a common plane each loop being in phase opposition with each adjacent loop;
   each antenna having an effective total loop area of one phase equal to the effective total loop area of opposite phase.

2. The antenna system of claim 1 wherein each antenna has a center loop of area twice that of each outer loop.

3. The antenna system of claim 1 wherein the loops of each antenna are generally rectangular.

4. An antenna system for use in an electronic security system for detection of unauthorized removal of items containing a resonant tag circuit, said antenna system comprising:
   a transmiting antenna coupled to the security system transmitter and a receiving antenna coupled to the security system receiver, said antennas being disposed in spaced parallel relationship and between which said items must pass for detection;
   each of said antennas including three coplanar loops lying successively along an antenna axis, each loop being twisted 180° with respect to each adjacent loop to be in phase opposition, the center loop being of one phase and the outer loops each beng of opposite phase to that of the center loop;
   the effective total loop area of one phase being equal to the effective total loop area of opposite phase.

5. The antenna system of claim 4 wherein the center loop of each of said antennas has an area which is twice the area of each of the outer loops.

6. The antenna system of claim 5 wherein the loops of each of said antennas are generally rectangular.

7. The antenna system of claim 4 wherein each of said antennas has a loop configuration substantially identical to that of the other antenna.

* * * * *